United States Patent
Katikaneni et al.

(10) Patent No.: US 9,017,433 B2
(45) Date of Patent: Apr. 28, 2015

(54) PRE-PROCESSING ASSEMBLY FOR PRE-PROCESSING FUEL FEEDSTOCKS FOR USE IN A FUEL CELL SYSTEM

(75) Inventors: Sai P. Katikaneni, Dhahran (SA); Joseph M. Daly, Bethel, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 382 days.

(21) Appl. No.: 13/006,959

(22) Filed: Jan. 14, 2011

(65) Prior Publication Data

US 2011/0192085 A1    Aug. 11, 2011

Related U.S. Application Data

(62) Division of application No. 12/478,283, filed on Jun. 4, 2009, now Pat. No. 7,871,450, which is a division of application No. 10/979,698, filed on Nov. 2, 2004, now abandoned.

(51) Int. Cl.
*B01J 7/00* (2006.01)
*B01J 8/04* (2006.01)
(Continued)

(52) U.S. Cl.
CPC ............ *B01J 8/0453* (2013.01); *B01J 19/2485* (2013.01); *B01J 2208/00176* (2013.01); *B01J 2208/00884* (2013.01); *B01J 2208/025* (2013.01); *B01J 2219/0004* (2013.01);
(Continued)

(58) Field of Classification Search
CPC ................... B01J 2208/025; B01J 2219/0004; B01J 8/0453; C01B 2203/143; C01B 3/382
See application file for complete search history.

(56) References Cited

U.S. PATENT DOCUMENTS 2,593,584 A * 4/1952 Lynch .......................... 48/198.7
5,252,609 A   10/1993 Pinto
(Continued)

FOREIGN PATENT DOCUMENTS

| DE | 19926443 A | 12/2000 |
|----|------------|---------|
| JP | 2001-348207 | 12/2001 |
| JP | 2003-327408 | 11/2003 |

OTHER PUBLICATIONS

G. Steinfeld, et al., Distillate Fuel Processing for Marine Fuel Cell Applications, Presentation paper at the AlCHe Spring 2000 Meeting, Atlanta, GA, Mar. 5-9, 2000, p. 4.
(Continued)

*Primary Examiner* — Imran Akram
(74) *Attorney, Agent, or Firm* — Cowan, Liebowitz & Latman, P.C.

(57) ABSTRACT

A pre-processing assembly and method for processing fuel feedstock containing oxygen and hydrocarbons having higher and lower hydrocarbon content for a fuel cell, wherein the pre-processing assembly has a deoxidizing bed for reducing oxygen in the fuel feedstock and a pre-reforming bed for reducing higher hydrocarbon content in the fuel feedstock and wherein the deoxidizing bed and the pre-reforming bed are disposed within a common reaction vessel such that the fuel feedstock first passes through the deoxidizing bed and thereafter through the pre-reforming bed. The pre-reforming assembly may further include a propane processor bed for processing propane and propylene in the fuel feedstock, where the propane processor bed is disposed within the common reaction vessel with the deoxidizing bed and the pre-reforming bed.

22 Claims, 8 Drawing Sheets (51) Int. Cl.
*B01J 19/24* (2006.01)
*C01B 3/38* (2006.01)
*H01M 8/06* (2006.01)
*H01M 8/12* (2006.01)
*H01M 8/14* (2006.01)

(52) U.S. Cl.
CPC . *C01B3/38* (2013.01); *C01B 3/382* (2013.01); *C01B 3/386* (2013.01); C01B 2203/0233 (2013.01); C01B 2203/0261 (2013.01); C01B 2203/066 (2013.01); C01B 2203/1241 (2013.01); C01B 2203/1247 (2013.01); C01B 2203/1258 (2013.01); C01B 2203/127 (2013.01); C01B 2203/143 (2013.01); *H01M 8/0618* (2013.01); *H01M 8/0675* (2013.01); H01M 2008/1293 (2013.01); H01M 2008/147 (2013.01); Y02E 60/50 (2013.01); *Y02E 60/525* (2013.01); *Y02E 60/526* (2013.01)

(56) References Cited

U.S. PATENT DOCUMENTS

| | | | | |
|---|---|---|---|---|
| 5,456,822 | A * | 10/1995 | Marcilly et al. | 208/136 |
| 5,725,964 | A | 3/1998 | Huppmann | |
| 5,733,518 | A * | 3/1998 | Durante et al. | 423/248 |
| 6,048,472 | A | 4/2000 | Nataraj et al. | |
| 6,069,271 | A * | 5/2000 | Tanimoto et al. | 562/545 |
| 6,110,979 | A | 8/2000 | Nataraj et al. | |
| 6,117,916 | A | 9/2000 | Allam et al. | |
| 2002/0031690 | A1* | 3/2002 | Shimazu et al. | 429/19 |
| 2003/0101713 | A1 | 6/2003 | Dalla Betta et al. | |
| 2004/0067395 | A1 | 4/2004 | Nakata et al. | |
| 2004/0146458 | A1 | 7/2004 | Weissman et al. | |
| 2004/0180974 | A1* | 9/2004 | Espinoza et al. | 518/726 |
| 2004/0228780 | A1* | 11/2004 | Butler et al. | 422/196 |
| 2005/0234278 | A1 | 10/2005 | van Egmond et al. | |
| 2006/0057058 | A1* | 3/2006 | Dahl et al. | 423/648.1 |
| 2006/0165573 | A1 | 7/2006 | Ohmi et al. | |
| 2006/0166054 | A1 | 7/2006 | Ahmed | |

OTHER PUBLICATIONS

EG&G Technical Services, Inc., Fuel Cell Handbook, 6th Edition, p. 8-23.

H.C. Maru, et al., Molten Carbonate Fuel Cell Product Design Improvement, Semi-Annual Technical Progress Report (Jun. 21 to Dec. 31, 2002), pp. 4-16.

G. Steinfeld, Basis of Design, Kentucky Pioneer Energy IGCC CCT Fuel Cell Demonstration, May 22, 2003, p. 14.

Apr. 16, 2008 U.S. Office Action, that issued in the related U.S. Appl. No. 10/979,698.

Apr. 15, 2010 U.S. Office Action, that issued in a U.S. Appl. No. 12/478,283.

* cited by examiner

| Fuel Feedstock Gas | % Oxygen | | Deoxidizer Bed Temp. (°C) | | |
|---|---|---|---|---|---|
| | Inlet | Outlet | Inlet | Outlet | Rise |
| Natural Gas (Baseline) | 0% | N.D. | 434 | 432 | -2 |
| Digester Gas<br>(60% Natural Gas, 40% $CO_2$) | 0.26% | N.D. | 420 | 425 | 5 |
| | 0.43% | N.D. | 350 | 367 | 17 |
| | 1.18% | N.D. | 439 | 469 | 30 |
| | 1.07% | N.D. | 312 | 351 | 39 |
| Coal Mine Methane<br>(72% Natural Gas, 6% $CO_2$, 22% $N_2$) | 0.17% | N.D. | 385 | 390 | 5 |
| Peak Shave Gas<br>(Natural Gas, Propane, Air) | 1.03% | N.D | 412 | 426 | 14 |
| | 1.05% | N.D. | 312 | 336 | 24 |
| | 3.04% | N.D. | 405 | 443 | 38 |
| | 5.00% | N.D. | 340 | 397 | 57 |
| | 4.97% | N.D. | 409 | 447 | 38 |

| Hydrocarbon Feedstock Fuel | Natural Gas | HD-5 Propane with Added Propylene |
|---|---|---|
| Feedstock Composition | | |
| Methane | 95.9% | 0 |
| Ethane | 2.23% | 7.2% |
| Propane | 0.36% | 88.0% |
| Propylene | 0 | 4.02% |
| Butanes | 0.16% | 0.6% |
| Carbon Dioxide | 0.92% | 0 |
| Steam/Carbon | 2.0 | 3.0 |
| Inlet Temperature | 482°C | 355°C |
| Space Velocity (Hr$^{-1}$) | | |
| Deoxidizer 204 | 8,380 | 11,780 |
| Propane Processor 301 | 7,820 | 10,990 |
| Pre-Reformer 206 | 3,450 | 4,850 |
| Exit Composition | | |
| Hydrogen | 26.8% | 24.9% |
| Methane | 64.8% | 58.5% |
| Carbon Dioxide | 7.7% | 19.1% |
| Higher Hydrocarbons | Nil | Nil |

PRE-PROCESSING ASSEMBLY FOR PRE-PROCESSING FUEL FEEDSTOCKS FOR USE IN A FUEL CELL SYSTEM

CROSS-REFERENCE TO RELATED APPLICATION

This application is a divisional of application of Ser. No. 12/478,283, filed Jun. 4, 2009 now U.S. Pat. No. 7,871,450, which, in turn is a divisional of Ser. No. 10/979,698, filed Nov. 2, 2004 now abandoned, the entire disclosures of which are hereby incorporated by reference.

BACKGROUND OF THE INVENTION

This invention relates to processing of fuel feedstocks containing hydrocarbons for use in fuel cell systems and, in particular, to pre-processing assemblies for performing pre-processing of the fuel feedstocks.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas is passed through the cathode. In order to produce a useful power level, a number of individual fuel cells are stacked in series with an electrically conductive separator plate between each cell.

Current fuel cells require as the reactant fuel gas a clean gas composed of hydrogen or a mixture of hydrogen and carbon monoxide. The reactant fuel gas is generally developed from a hydrocarbon-containing feedstock using a reforming process. The hydrocarbon-containing feedstock usually contains substantial amounts of lower hydrocarbons, i.e., hydrocarbons with 2 or less carbons, such as methane, as well as small amounts of hydrogen, carbon dioxide, nitrogen and higher hydrocarbons, i.e. hydrocarbons with more than 2 carbons. This is true, for example, when the fuel feedstock is natural gas, peak shaving gas, digester gas and coal bed methane.

The fuel feedstock is usually subjected to pre-processing to reduce or eliminate the higher hydrocarbons and to convert a portion of the lower hydrocarbons to methane, hydrogen and carbon dioxide. The feedstock is then further processed in a reforming unit to generate a fuel gas rich in hydrogen.

Conventional pre-processing is carried out using a deoxidizer assembly followed by a pre-reforming assembly. The deoxidizer assembly reduces the concentration of oxygen in the fuel feedstock before the feedstock enters the pre-reforming assembly. This protects the catalyst (usually, a Ni-based catalyst) used in the pre-reforming assembly, which otherwise would be deactivated in the presence of oxygen.

In the pre-reforming assembly, the reforming reaction is a conversion process which may inadvertently result in carbon formation based on fuel composition and steam. Carbon formation is of a particular concern when the fuel feedstock contains propylene, since the propensity to form carbon increases as the concentration of propylene increases. The carbon which is produced deposits at the active sites of the reforming catalyst of the pre-reforming assembly, thereby deactivating the catalyst. This reduces the life of the pre-reforming assembly.

In order to reduce carbon formation in conventional pre-reforming assemblies, special catalysts either containing alkali or based on an active magnesia support have been proposed. Another technique is to use adiabatic processing. In such case, a fixed bed adiabatic pre-reforming assembly converts the higher hydrocarbon content at low temperature with steam into methane, hydrogen and carbon oxides.

Propylene-containing fuel feedstocks generally have a high concentration of sulfur-containing compounds. These compounds also tend to deactivate the reforming catalysts in the pre-reforming assembly. Although fuel feedstocks are typically desulfurized in a desulfurizer unit before being carried to the pre-reforming assembly, high sulfur concentration and the propylene in the fuel feedstocks reduce the capacity of the desulfurizer unit.

Fuel feedstocks supplied to the pre-reforming assembly must also be supplied with additional hydrogen from a hydrogen supply. This is required to provide a sufficient concentration of hydrogen in the feedstocks to maintain a reducing environment for the reforming catalyst, thereby maintaining the catalyst activity.

As can be appreciated, conventional pre-processing of fuel feedstocks is complex and costly, due to the need for additional units or special components for supplying hydrogen, for reducing carbon formation and for removing propylene and an additional unit to remove oxygen entering into the pre-reforming assembly. A pre-processing assembly of simpler design, less cost and longer life would thus be desirable.

It is therefore an object of the present invention to provide a pre-processing assembly which is better able to process fuel feedstocks containing hydrocarbons and oxygen without deactivation of the pre-processing catalyst.

It is a further object of the invention to provide a pre-processing assembly which is capable of operating without an additional hydrogen supply and has an increased operating life.

It is yet a further object of the invention to provide a pre-processing assembly which is specifically adapted to retard the affects of propylene and other olefins in hydrocarbon containing fuel feedstocks.

SUMMARY OF THE INVENTION

In accordance with the principles of the present invention, the above and other objectives are realized in a pre-processing assembly and method for pre-processing a fuel feedstock containing hydrocarbons including higher hydrocarbon content in which a common vessel houses both a deoxidizing unit for reducing the oxygen content in the fuel feedstock and a pre-reforming unit for receiving the fuel feedstock after passage through the deoxidizing unit and for reducing the higher hydrocarbon content in the fuel feedstock. In performing this pre-processing the assembly also reduces a portion of the lower hydrocarbon content in the feedstock and increases the hydrogen content.

In the embodiment of the invention disclosed herein, the pre-reforming unit is arranged to follow the deoxidizing unit along the flow path of the fuel feedstock and both units are in bed form. Also, in this embodiment, the catalyst of the deoxidizing bed is one of a Pt—Pd on alumina catalyst or a Pt—Rh-based catalyst or a Rh—Pt-based alumina catalyst and the catalyst of the pre-reforming bed is nickel-based and one of C11-PR (Sud Chemie), CRG-F (Johnson Matthey), CRG-LH (Johnson Matthey) and G-180 (BASF).

In a further aspect of the invention, the pre-processing assembly further includes a propane processor unit for processing propane and propylene in the fuel feedstock. In the embodiment disclosed, the propane processor unit is in bed form and arranged between the deoxidizing bed and the pre-reforming bed. The propane processor bed has a nickel-based carbon resistant catalyst, such as FCR-HC59 (Sud Chemie).

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
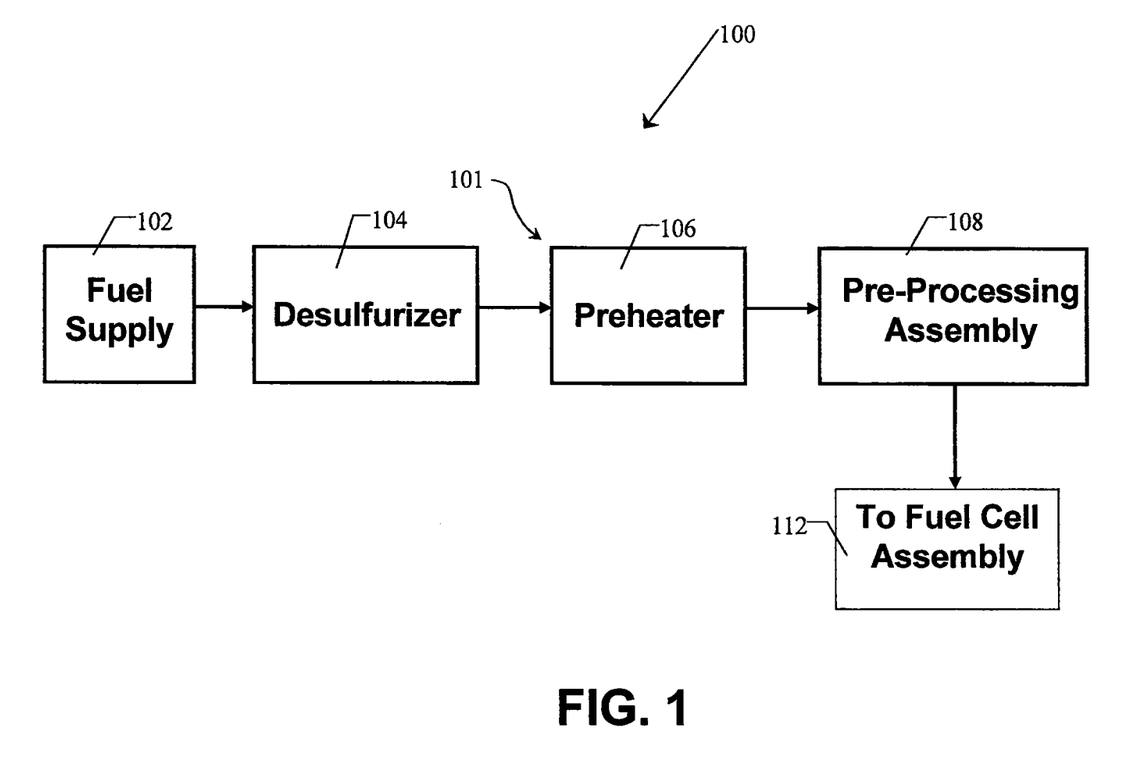
FIG. 1 shows a fuel cell system having a fuel delivery system which uses a pre-processing assembly in accordance with the principles of the present invention.

FIG. 1 shows a fuel cell system 100 comprising a fuel delivery system 101 having a pre-processing assembly 108 in accordance with the principles of the present invention. The fuel delivery system 101 delivers hydrogen rich fuel to a fuel cell assembly 112 and includes a fuel supply 102. The fuel supply 102 provides a fuel feedstock containing substantial amounts of methane and carbon oxides (CO and $CO_2$), and a higher hydrocarbon content, such as, for example, ethane, propane and $C_4+$ hydrocarbons, and amounts of oxygen and hydrogen. Typically, the fuel feedstock might be natural gas, peak shaving gas, digester gas, propane, coal bed methane, HD-5 or LPG.

The fuel delivery system 101 also includes a desulfurizer 104, a preheater 106 and a reformer 110. The fuel feedstock from the fuel supply 102 is passed to the desulfurizer 104, where sulfur-containing compounds in the fuel feedstock are physically and/or chemically removed. Desulfurized fuel feedstock then flows to the pre-heater 106 where it is preheated to a suitable temperature, e.g., approximately 375° C., before being carried to the fuel pre-processing assembly 108. Pre-processed fuel feedstock exiting the assembly 108 is suitable for use in a fuel cell assembly 112. In the fuel cell assembly 112, the hydrogen-rich fuel undergoes an electrochemical reaction to produce power.

As discussed in detail herein below, in accordance with the principles of the present invention, the pre-processing assembly 108 includes a plurality of fuel processing units disposed or housed in a common vessel for deoxidizing the fuel feedstock and for pre-reforming the deoxidized fuel feedstock to reduce or substantially eliminate the higher hydrocarbon content. This pre-reforming processing also reduces the lower hydrocarbon content by converting it to hydrogen so that the resultant pre-processed fuel feedstock exiting the assembly 108 has increased hydrogen content and methane suitable for high temperature fuel cell applications.

Figure 2:
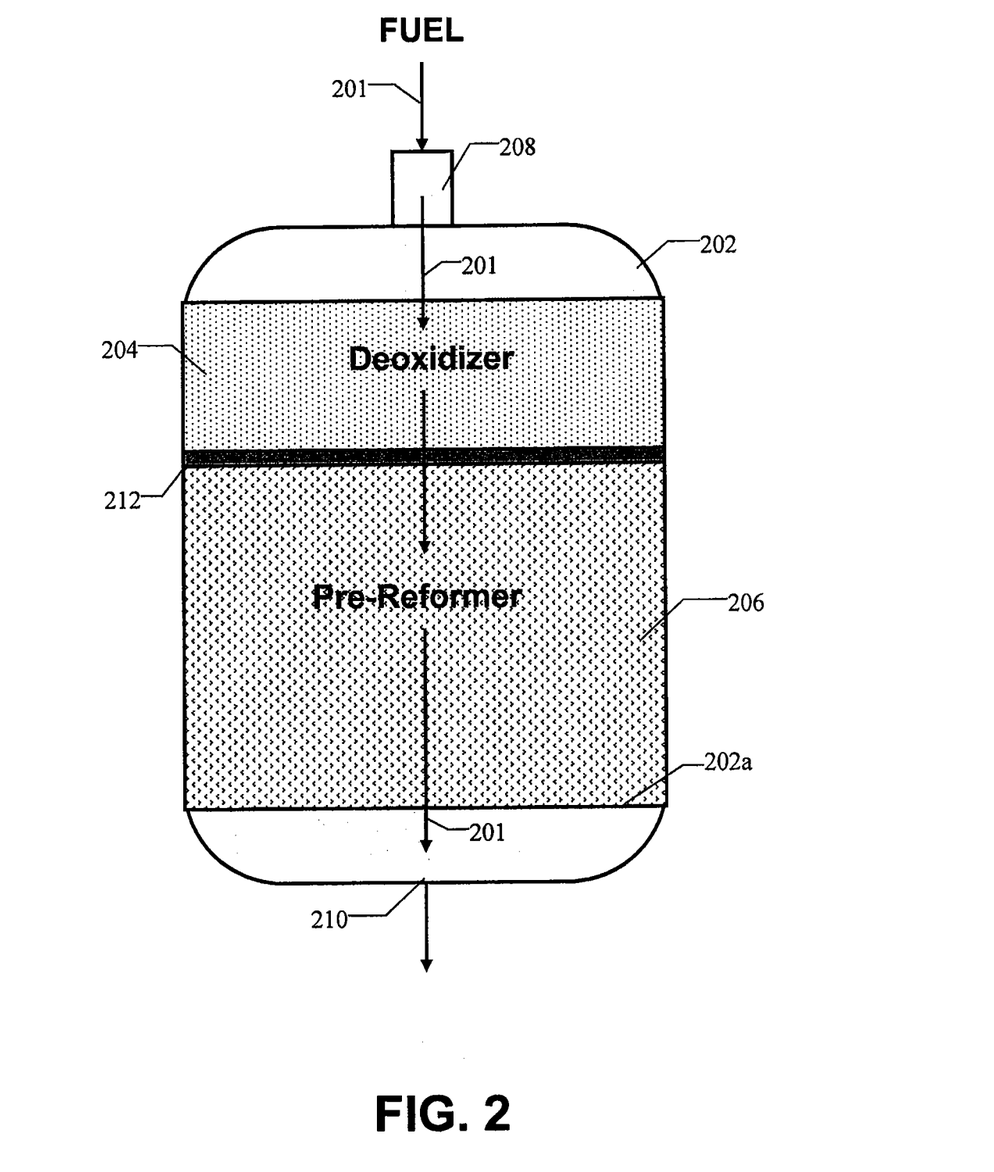
FIG. 2 shows a detailed schematic view of a first embodiment of the pre-processing assembly of FIG. 1.

A detailed schematic view of a first embodiment of the pre-processing assembly 108 is shown in FIG. 2. As shown, the pre-processing assembly 108 includes two fuel processing units in the form of a deoxidizer bed 204 and a pre-reforming bed 206. These beds are arranged or housed in a common vessel 202 having an inlet 208 for receiving the preheated fuel feedstock from the preheater 106 and an outlet 210 for discharging the pre-processed fuel feedstock to the fuel cell assembly 112.

As shown, the pre-reforming bed 206 is arranged to follow the deoxidizer bed 204 along the flow path 201 of the feedstock. Also, a porous member, shown as a screen 212 which typically can be made of Nickel mesh having a mesh size of 10-14, separates the beds and provides support for the bed 204. The pre-processing bed 206, in turn, is supported on the lower surface 202a of the vessel 202.

The deoxidizer bed 204 comprises a deoxidizing catalyst which typically might be Pt/Pd on Alumina, or G-74D, manufactured by Sud Chemie Inc. Other catalysts such as Pt—Rh based catalysts and Rh—Pd based Alumina catalysts also may be used.

The catalyst used in the pre-reforming bed 206 may be a standard nickel based catalyst. Examples are nickel-based alumina catalysts, or C11-PR catalyst, manufactured by Sud-Chemie Inc. Additionally, other nickel-based catalysts such as CRG-F and CRG-LH, manufactured by Johnson Matthey or G-180 manufactured by BASF may likewise be used.

The shapes of the catalysts used in both beds may vary. For example, in the case shown, pellet-shaped catalysts are employed in both the deoxidizer bed 204 and the pre-reforming bed 206. In addition, monolith-based catalyst structures, comprising a ceramic monolith substrate with a catalyst coating, are suitable for use in each bed.

As mentioned above, the pre-processing assembly 108 reduces or substantially eliminates the higher hydrocarbon content and the oxygen content in the fuel feedstock. It also reduces the lower hydrocarbon content and increases the hydrogen content in the feedstock. Due to the arrangement of the deoxidizer and pre-reforming beds 204 and 206 in the common vessel 202, the pre-processing reduces the possibility of deactivating the catalysts in the beds and is carried out without the need of adding hydrogen from a hydrogen supply to the fuel feedstock.

In particular, the catalyst of the deoxidizer bed 204 facilitates the removal of oxygen from the fuel feedstock. Where the feedstock is coal mine methane or digester gas, the oxygen is removed by reacting the oxygen with the methane in the feedstock aided by the catalyst, as follows:

Where the feedstock is peakshaving gas, the oxygen is removed in the deoxidizer bed 204 by reacting the propane in the feedstock with oxygen, as follows:

$$C_3H_8 + 2O_2 \rightarrow 2CO + 2CO_2 + 4H_2 + \text{heat}$$

Removal of oxygen in the deoxidizer bed 204 prevents the deactivation of the catalyst in the pre-reforming bed 206. It also produces additional hydrogen needed to maintain a reducing environment for such catalyst. In the pre-reforming bed 206, the reduction of the higher hydrocarbon content in the deoxidized feedstock is aided by the catalyst and occurs by conversion of the higher hydrocarbon content into a mixture of hydrogen, carbon oxides and methane. A reduction in the lower hydrocarbon content also occurs through conversion and results in increased hydrogen and carbon oxides. Particularly, approximately 10% of the methane in the fuel is reformed to provide hydrogen for the electrochemical reaction in the fuel cell assembly. The remainder of the methane in the fuel is internally reformed in the fuel cell assembly. The following reactions exemplify the conversion processing:

$$C_nH_m + nH_2O \rightarrow nCO + (m/2 + n)H_2$$

$$CH_4 + H_2O \rightarrow CO + 3H_2$$

$$C_3H_8 + 2H_2O \rightarrow CO_2 + 2CH_4 + 2H_2$$

As mentioned above, the deoxidizer bed 204 is firstly disposed in the vessel 202 in relation to the direction of the flow or flow path 201 of the fuel feedstock and to the inlet of the vessel 202. The pre-reforming bed 206 then follows the deoxidizer bed 204 in the direction of the flow path 201. As was stated previously, this arrangement causes the removal of oxygen from the fuel feedstock before entering the pre-reforming bed, thereby preventing deactivation of the catalyst in the bed. The life of the pre-processing assembly 108 is thus extended.

As can also be seen from the above, the deoxidizing and pre-reforming reactions in the beds 204 and 206 increase the hydrogen content in the feedstock. This maintains a reducing environment in the pre-reforming bed 206. In particular, back diffusion of hydrogen in the pre-reforming bed 206 provides this reducing environment, thereby allowing the assembly 108 to operate without an additional supply of hydrogen to the fuel feedstock.

The amount of back diffusion of hydrogen in the bed 206 is inversely related to the space velocity of the fuel feedstock. Accordingly, maintaining a low space velocity of the fuel feedstock through the pre-reforming bed 206 is desired in order to realize sufficient hydrogen back diffusion in the bed.

As can be appreciated, the space velocity is directly proportional to the flow of the fuel through the pre-reforming bed 206 and inversely proportional to the volume of the catalyst in the pre-reforming bed 206. Accordingly, the space velocity of the fuel feedstock can be controlled by adjusting the volume of the catalyst in the pre-reforming bed 206 and/or by changing the amount of the fuel flowing through the reforming bed 206, using the following relationship:

$$SV = \frac{\text{Fuel Flow per hour}}{\text{Catalyst Volume}}$$

In addition to controlling the space velocity of the fuel feedstock, the superficial velocity of the fuel needs to be controlled for a desired amount of hydrogen back diffusion. Superficial velocity is a function of a diameter of the vessel through which the fuel is flowing. Particularly, superficial velocity is directly proportional to the fuel flow and inversely proportional to the diameter of the pre-reforming bed 206.

In the pre-processing assembly 108 of the present invention, space velocities between 2,000 to 5,000 $h^{-1}$ and maximum superficial velocities of approximately 1.3 ft/s have been found desirable in operation of the pre-reforming bed 206.

Moreover, the pre-reforming bed 206 may additionally be adapted to act as a guard to trap sulfur-containing compounds present in the fuel feedstock which are not removed by the desulfurizer unit 104 of FIG. 1. In particular, the nickel in pre-reforming catalyst is suitable for trapping sulfur-containing compounds effectively. With this additional sulfur removal, the operating life of the reforming catalyst in the fuel cell assembly 112 can be increased.

The optimal design of the pre-reforming assembly 108 will depend upon the particular application. Some of the important factors to be considered are the requirements of the fuel cell assembly 112, the type of fuel gas being processed, and the amount of gas to be treated. An illustrative example of a pre-reforming assembly 108 is described herein below.

Example 1

The pre-processing assembly 108 has been optimized for processing fuel feedstock comprising oxygen and methane for use in a 300 kW Direct Fuel Cell power plant. The deoxidizer bed 204 comprises a G-74D catalyst and has a volume of 0.7 cubic feet. The pre-reforming bed 206 comprises a C11-PR catalyst and has a volume of 2.5 cubic feet. The deoxidizer bed 204 is approximately 4 inches in thickness and the pre-reforming bed 206 is approximately 14.5 inches in thickness. The common vessel 202 is made from 304/310 stainless steel and has a volume of 4 cubic feet and a diameter of 20 inches.

The optimal temperatures of the fuel feedstock entering the vessel 202 through the inlet 208 and of the pre-processed fuel feedstock exiting the vessel 202 through the outlet 210 are approximately 300 to 490° C. The optimal operating temperature range of the deoxidizer bed 204 is between 300° C. and 600° C., and the optimal operating temperature range of the pre-reforming bed 206 is between 320° C. and 540° C. The space velocity of the fuel feedstock flowing through the deoxidizer bed 204 is between 5,000 and 12,000 $h^{-1}$ and the space velocity of the fuel feedstock flowing through the pre-reforming bed 206 is between 2,000 and 5,000 $h^{-1}$. Moreover, in order to maintain a desired hydrogen back diffusion in the pre-reforming bed 206, the desired maximum superficial velocity of the fuel feedstock flowing through the bed 206 is 1.3 ft/s at STP conditions.

The performance of the pre-processing assembly 108 was tested by passing through the assembly 108 fuel feedstock comprising 6.31 lb-mole/hr of methane, 0.06 lb-mole/hr of carbon dioxide, 12.48 lb-mole/hr water, 0.08 lb-mole/hr of nitrogen, 0.17 lb-mole/hr of ethane and 0.03 lb-mole/hr of propane. The temperature of the fuel feedstock entering the deoxidizer bed 204 was approximately 425° C. and the space velocity of the fuel feedstock was approximately 10,000 $hr^{-1}$. The temperature of the pre-processed fuel leaving the pre-reforming bed 206 was about 320° C., and the space velocity of the pre-reformed fuel leaving the pre-reforming bed 206 was about 3,000 $hr^{-1}$. Fuel pre-processed using the pre-processing assembly comprised about 1.67 lb-mole/hr of hydrogen, 6.25 lb-mole/hr of methane, 0.53 lb-mole/hr of carbon dioxide, 11.54 lb-mole/hr of water and 0.08 lb-mole/hr of nitrogen. From these performance results, it can be seen that all of the ethane or propane present in the fuel feedstock was converted to methane, hydrogen and carbon dioxide in the assembly 108.

Example 2

In this example, the pre-processing assembly 108 of Example 1 has also been optimized for processing hydrocarbon fuels contaminated with up to 10% oxygen. The optimal temperature range of the fuel feedstock entering the vessel 202 through inlet 208 is approximately 310° C. to 500° C.

Figure 3:
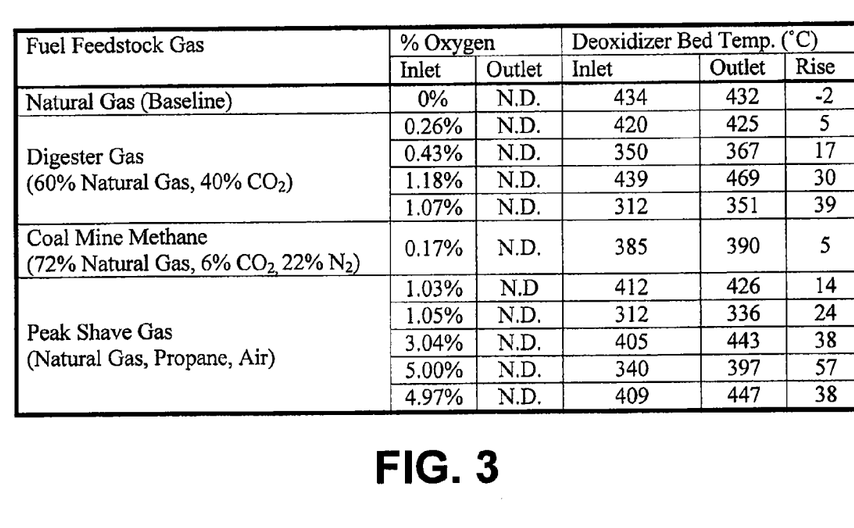
FIG. 3 shows a table of performance data of a deoxidizer of FIG. 2.

The deoxidizing function of the pre-processing assembly 108 of FIG. 2 has been demonstrated with fuels containing oxygen such as anaerobic digester gas, coal mine methane, and peak shave gas. The deoxidizing performance of the assembly 108 of this example was tested at varied inlet temperatures of the fuel feedstock entering the assembly 108, and varied oxygen contents of the hydrocarbon fuels. FIG. 3 shows tabulated data of deoxidizer performance summarizing the results of these tests. In the testing procedure, the oxygen content of the inlet fuel feedstock was measured, and the fuel feedstock was pre-heated to various temperatures ranging from 312° C. to 439° C. before entering the assembly 108. The concentration of oxygen in the pre-processed fuel feedstock gas exiting the deoxidizer bed 204 and the temperature, at deoxidizer and pre-reformer bed interface were measured. The flow rate of the fuel feedstock through the assembly was 15 standard cubic feet per minute (scfm) of natural gas, with the diluents, such as carbon dioxide, nitrogen, propane and air, added as listed in FIG. 3, or, for peak shave gas, at a predetermined ratio so as to give the same heating value. The fuel feedstock used during these tests had a steam to carbon ratio of 2.0.

As the tabulated data of FIG. 3 show, pre-processed fuel feedstock leaving the assembly 108 was depleted of all oxygen. The temperature rise across the deoxidizer bed 204 is an indication of the reaction of oxygen with the hydrocarbon fuel feedstock. Accordingly, these tests show that the deoxidizer bed 204 is capable of removing oxygen from fuel feedstock over a wide temperature range and over a wide variation in concentration of contaminant oxygen in the inlet fuel feedstock.

A pre-processing assembly 108 having this construction is estimated to have a life of approximately 5 years as compared to an average 3-year operating life of a conventional assembly. The life of the pre-processing assembly 108 is increased partly due to the maintenance of the pre-reforming bed 206 in a reducing atmosphere by providing hydrogen from the deoxidizer and from optimized hydrogen back diffusion, thereby increasing the overall life of the pre-reforming catalyst.

Figure 4:
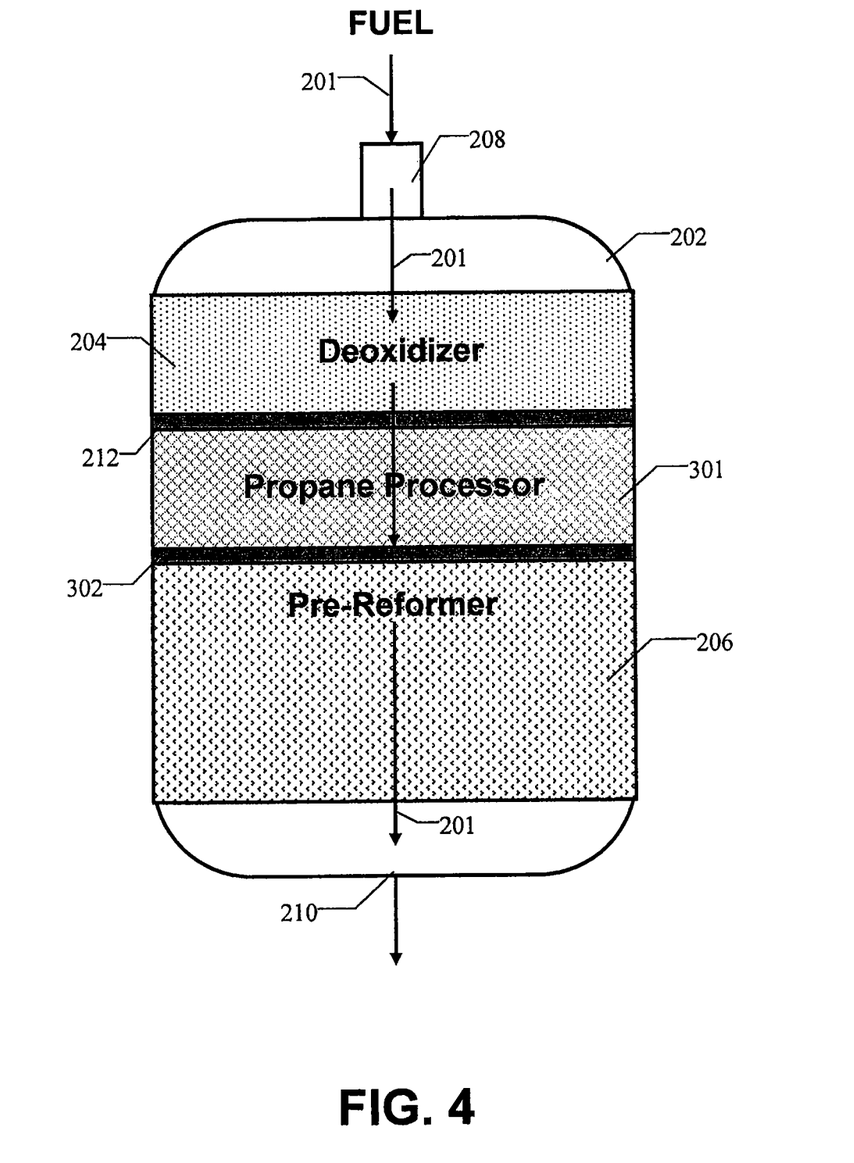
FIG. 4 shows a detailed schematic view of a second embodiment of the pre-processing assembly of FIG. 1.

In accordance with a further aspect of the invention and to further improve the performance and the operating life of the pre-processing assembly 108 when the fuel feedstock includes propane and/or propylene, the assembly 108 is additionally adapted as shown in FIG. 4. More particularly, FIG. 4 shows a second embodiment of the pre-processing assembly 108 of FIG. 2 modified to include a propane processor bed 301, adapted to convert propane and propylene in the fuel feedstock to methane and carbon oxides.

As shown in FIG. 4, the propane processor bed 301 is disposed in the vessel 202 between the deoxidizer bed 204 and the pre-reforming bed 206. In particular, the bed 301 is situated below the screen 212 and rests on a further like screen 302 which separates the bed 301 from the bed 206. The fuel feedstock thus now flows through the deoxidizer bed 204 in which oxygen reduction occurs, through the bed 301 in which propane and propylene are removed through conversion to methane and carbon oxides and through the bed 206 in which pre-reforming causes a reduction in the higher hydrocarbon content and conversion of a part of the lower hydrocarbon content to hydrogen.

In the embodiment of FIG. 4, the beds 204 and 206 contain the same catalysts as those discussed above for the first embodiment of FIG. 2. The propane processor bed 301, in turn, comprises a nickel-based carbon resistant catalyst doped with promoters such as cerium oxide, lanthanum oxide, palladium, platinum, or a combination of these compounds. An example of a suitable nickel-based carbon resistant catalyst is FCR-HC59 manufactured by Sud Chemie. The carbon resistant catalyst in the propane processor bed 305 is selective towards propane and propylene and promotes the conversion of propane and propylene in the fuel feedstock to methane and carbon oxides, as follows:

The pre-processing assembly 108 of FIG. 4 is able to process commercial grade propane fuel comprising up to 5% propylene, or HD-5 gas. The performance of the pre-processing assembly will vary depending on the fuel feedstock inlet temperature, the space velocity of the fuel feedstock in the beds 204, 301, 206, and the steam to carbon ("S/C") ratio of the fuel feedstock.

As with the embodiment of FIG. 2, the optimal design of the pre-reforming assembly 108 of FIG. 4 will vary depending on the factors discussed for the embodiment of FIG. 2 and the additional factor of the propylene concentration. An illustrative example of a configuration of the pre-processing assembly 108 of FIG. 4 is described in Example 3 below.

Example 3

The pre-processing assembly of FIG. 4 has been optimized for processing fuel comprising propane and up to 5% propylene for use in a 300 kW Direct Fuel Cell power plant. The deoxidizer bed 204 comprises a G-74D catalyst and has a volume of 0.7 cubic feet. The propane processor bed 301 comprises an FCR-HC59 anti-carbon catalyst manufactured by Sud Chemie and has a volume of 0.75 cubic feet, and the pre-reforming bed 206 comprises a C11-PR catalyst and has a volume of 1.7 cubic feet. The vessel 202 is made from 304/310 stainless steel and has a volume of 4 cubic feet.

The optimal temperature of the fuel feedstock entering the vessel 202 through the inlet 208 is approximately 350° C. and the temperature of the pre-processed fuel exiting the vessel 202 through the outlet 210 is approximately 350° C. The deoxidizer bed 204 is adapted to operate at a temperature between 300° and 600° C., while the propane processor bed 301 and the pre-reforming bed 206 are adapted to operate at temperature between 300° and 540° C. The optimal operating temperature range of beds 204, 301 and 206 of the assembly 108 is between 300° C. and 400° C. The desired space velocity of the fuel feedstock flowing through the deoxidizer bed 204 is between 5,000 and 12,000 h$^{-1}$. The desired space velocity of the fuel feedstock flowing through the propane processor bed 301 is between 5,000 and 11,000 h$^{-1}$, while the desired space velocity of the fuel feedstock flowing through the pre-processing bed 206 is between 2,000 and 5,000 h$^{-1}$. Moreover, it is preferred that the steam to carbon ratio of the fuel feedstock entering the assembly is approximately 3.

The performance of the pre-processing assembly 108 of FIG. 4 was tested using propane fuel feedstock having various concentrations of propylene. Fuel feedstock used during these tests comprised pure propane with no propylene, HD-5 gas having 2538 ppm of propylene, and HD-5+ gas having approximately 5% propylene. The tests were performed at varied inlet temperatures of the fuel feedstock entering the assembly 108, varied space velocities and varied steam to carbon ratios.

Figure 5:
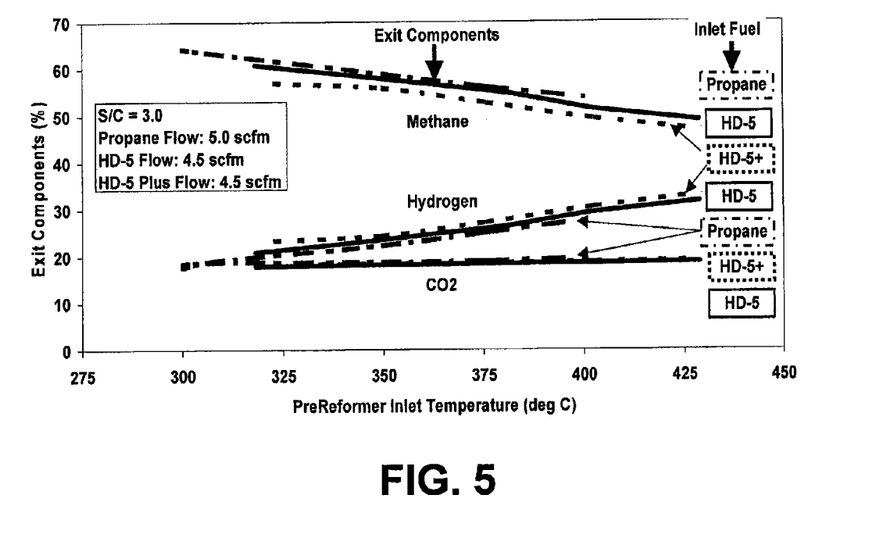
FIG. 5 shows a graph of performance data of the pre-processing assembly of FIG. 4.

FIG. 5 shows a graph of performance data resulting from the testing of the assembly 108 of FIG. 4 at different fuel feedstock inlet temperatures. In the testing procedure, fuel feedstock was pre-heated to various temperatures before entering the assembly 108 and the concentrations of the various components of the pre-processed fuel feedstock gas exiting the assembly were measured. The fuel feedstock used during this testing had a steam to carbon ratio of 3.0. The flow rate of the pure propane fuel feedstock gas through the assembly was at 5.0 standard cubic feet per minute ("scfm"), the flow rates of the HD-5 fuel feedstock gas and the HD-5+ fuel feedstock gas were at 4.5 scfm and the inlet temperatures of the fuel feedstock gas entering the assembly 108 ranged between 300 and 450° C.

As shown in FIG. 5, pre-processed fuel feedstock leaving the assembly 108 included methane, hydrogen and carbon dioxide content. The X-axis in FIG. 5 represents the pre-processing assembly inlet temperature, while the Y-axis represents the exit concentration of each of the components exiting in the pre-processed fuel feedstock gas.

As can be seen from FIG. 5, the respective concentrations of methane, hydrogen and carbon dioxide in the exiting pre-processed fuel feedstock gas resulting from the pure propane input feedstock are approximately the same as the respective concentrations of methane, hydrogen and carbon dioxide in the exiting pre-processed fuel feedstock gas resulting from the HD-5 and HD-5+ input feedstocks. Accordingly, these tests show that the assembly 108 is capable of pre-processing fuel feedstock with high propylene concentrations without degradation in performance.

As can also be seen, as the inlet temperature of the feedstock increased, the concentration of hydrogen in the exiting pre-processed fuel feedstock gas also increased, while the concentration of methane in the exiting pre-processed fuel feedstock gas decreased. Moreover, as shown, at all inlet temperatures the pre-processed fuel feedstock gas exiting the assembly included a sufficient concentration of hydrogen to maintain the pre-reforming catalyst in a reducing atmosphere, thus extending the operating life of the assembly 108.

Figure 6:
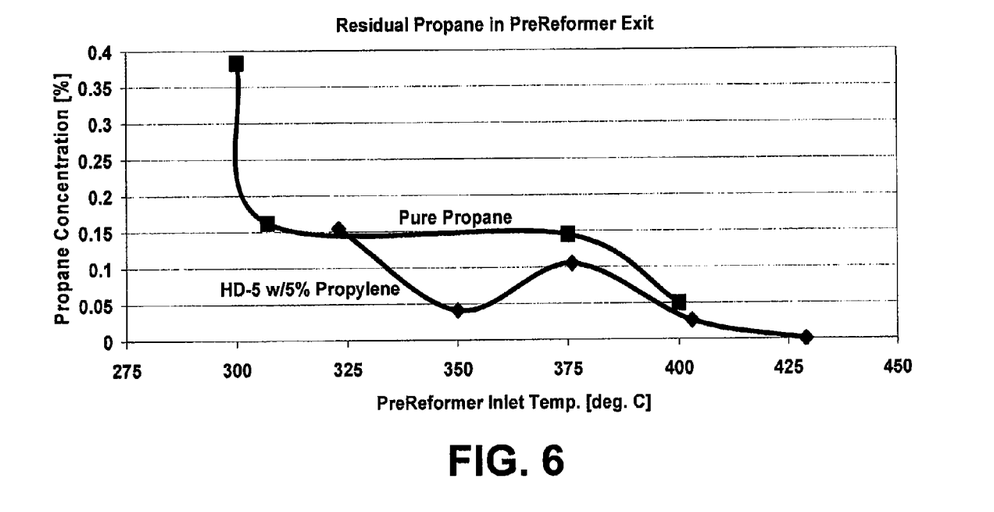
FIG. 6 shows a graph of residual concentration of propane in pre-processed fuel feedstock leaving the assembly of FIG. 4 at different fuel inlet temperatures.

FIG. 6 shows a graph of residual propane concentration in the exiting pre-processed fuel feedstock gas of the assembly 108 of FIG. 4 corresponding to various inlet temperatures of the feedstock. As shown in FIG. 6, the X-axis represents the inlet temperature of the feedstock entering the pre-processing assembly 108, and the Y-axis represents a percent concentration of propane in the exiting pre-processed fuel feedstock gas. As can be appreciated, the performance of the assembly is inversely related to the residual propane concentration in the exiting pre-processed fuel feedstock gas.

FIG. 6 shows that in all cases, even with lower inlet temperatures of approximately 300° C., the concentration of propane in the exiting pre-processed fuel is acceptably low. Furthermore, the concentration of propane in the exiting pre-processed fuel feedstock gas decreases as the inlet temperature of the fuel feedstock increases, to a point where propane is non-detectable at inlet temperatures above 425° C.

Based on the above tests performed at different fuel feedstock inlet temperatures, it can be seen that the performance of the assembly 108 is excellent over a wide temperature range, allowing the inlet temperature to be varied according to the desired outlet concentrations of hydrogen and methane. The optimal operating temperatures for the pre-processing assembly of FIG. 4 are between 300 and 450° Celsius.

The effect of fuel feedstock space velocity on the performance of the pre-processing assembly 108 of FIG. 4 was also tested using HD-5 and HD-5+ input fuel feedstock gases. During these tests, fuel feedstocks were passed through the assembly 108 with the gas space velocities of 1900 $h^{-1}$, 2660 $h^{-1}$, 3420 $h^{-1}$, and 9082 $h^{-1}$. The inlet temperature of the fuel feedstock was kept constant at 375° C. Percent concentrations of methane, hydrogen and carbon dioxide in the pre-processed fuel feedstock gas exiting the assembly 108 were recorded.

Figure 7:
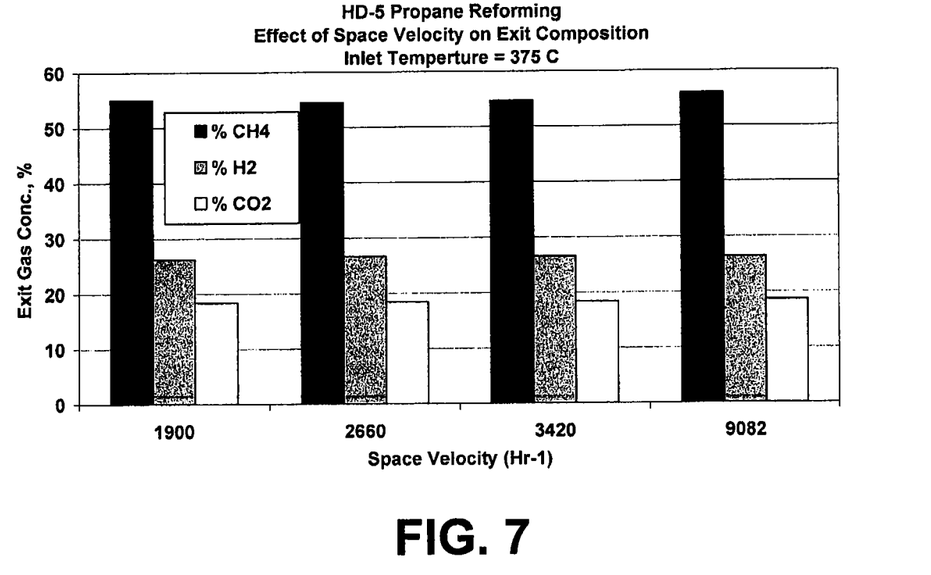
FIG. 7 shows a bar graph of component concentrations in exiting pre-processed fuel feedstocks at different gas space velocities of inlet HD-5 propane fuel feedstock gas.
Figure 8:
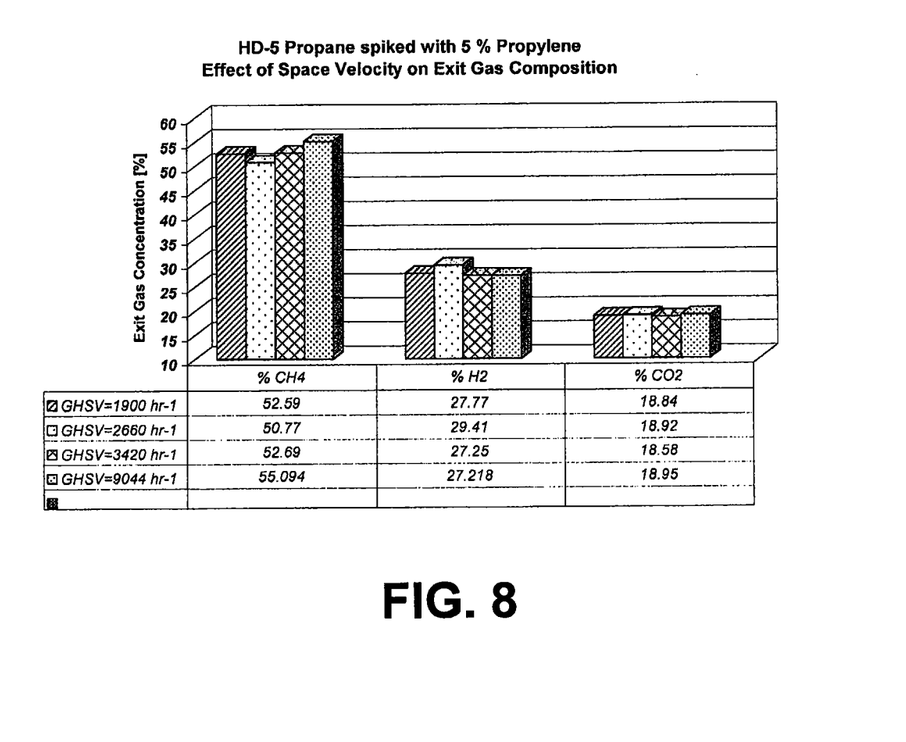
FIG. 8 shows a bar graph of component concentrations in exiting pre-processed fuel feedstock at different gas space velocities of inlet HD-5 propane fuel feedstock gas with five percent propylene.

FIGS. 7 and 8 show bar graphs of exit gas concentrations, with constant inlet temperature of 375° C., at different feedstock space velocities of HD-5 and HD-5+ fuel feedstocks, respectively, flowing through the assembly 108. The Y-axis in FIGS. 7 and 8 represents the percent concentration of each component in the exiting pre-processed fuel feedstock gas. As can be seen, the assembly 108 is able to effectively pre-process fuel feedstock flowing through it with a space velocity in the range of 1900 $h^{-1}$ and 9082 $h^{-1}$ and demonstrates excess capacity in this space velocity range. Additionally, these tests show that the performance of the assembly 108 is not greatly affected by an increase in the concentration of propylene in the HD-5+ fuel feedstock when its space velocity is in the range of 1900 $h^{-1}$ to 9044 $h^{-1}$.

Figure 9:
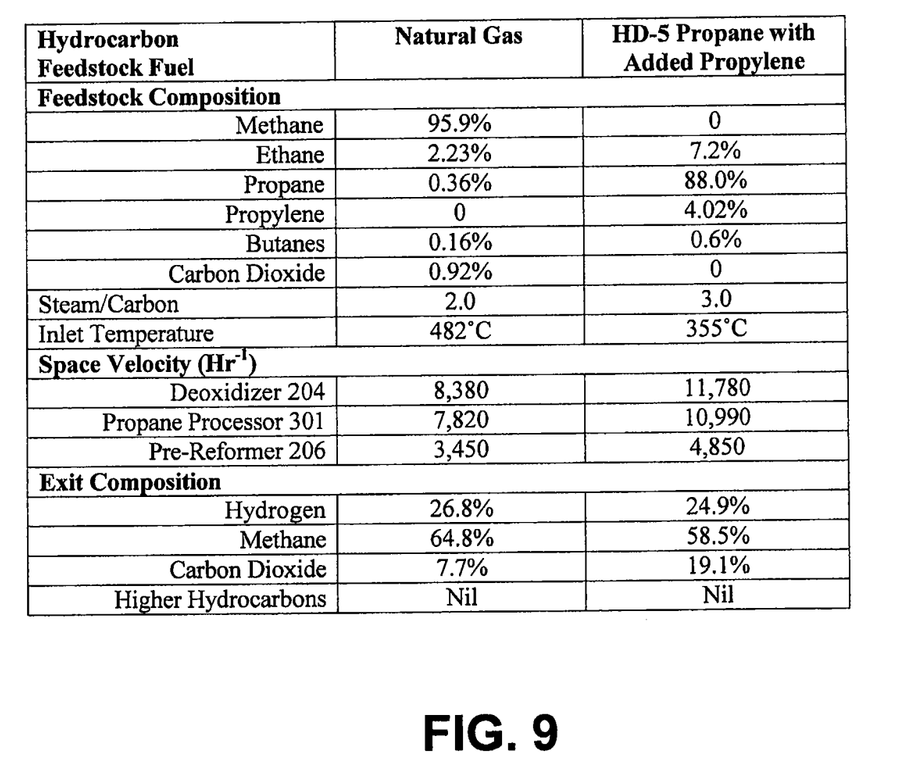
FIG. 9 shows a table summarizing conditions during performance test and performance results of the assembly of FIG. 4.

The performance of the assembly 108 of FIG. 4 has also been tested at other inlet temperatures with high space velocity for both HD-5 propane with added propylene and natural gas. FIG. 9 shows a table summarizing specific conditions during these tests, including fuel feedstock composition and inlet temperatures, and exit compositions of pre-processed natural gas and HD-5 propane with added propylene gas exiting the assembly 108 of FIG. 4. In particular, the inlet feedstock composition of natural gas includes 2.23% of ethane, 0.36% of propane and 0.16% of butanes, while the inlet feedstock composition of HD-5 propane with added propylene includes 7.2% of ethane, 88% of propane, 4.02% of propylene and 0.6% of butanes. As shown in FIG. 9, all of these higher hydrocarbons were removed by the pre-processing assembly 108. As these tests show, the assembly 108 of FIG. 4 has excellent performance at space velocities in the range of 12,000 $h^{-1}$ for the deoxidizer 204, 11,000 $h^{-1}$ for the propane processor 301, and 5,000 $h^{-1}$ for the pre-reformer 206.

Figure 10:
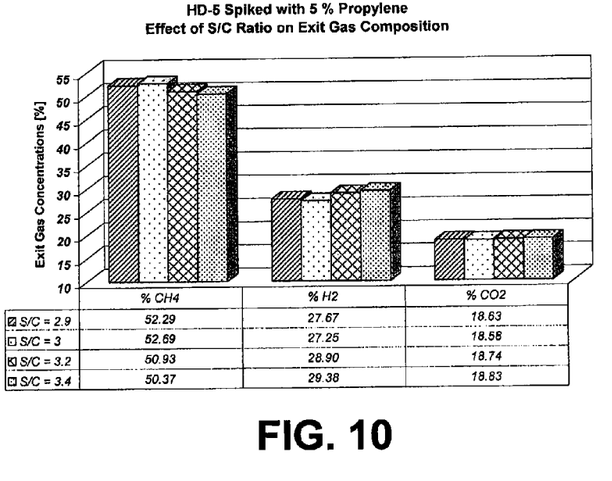
FIG. 10 shows a bar graph of component concentrations in exiting pre-processed fuel feedstock at different steam to carbon ratios of inlet HD-5 propane fuel feedstock with five percent propylene.

Furthermore, the performance of the assembly 108 of FIG. 4 was tested at different steam to carbon ratios. FIG. 10 shows a bar graph of the component concentrations in the exiting pre-processed fuel feedstock gas derived from HD-5+ fuel feedstock at different steam to carbon ratios. The tests were conducted with a constant fuel feedstock inlet temperature of 375° C. In FIG. 10, the Y-axis represents the percent concentration of the exit gas components. Performance testing was carried out by passing a mixture of HD-5+ fuel feedstock and steam with steam to carbon ratios of 2.9, 3.0, 3.2 and 3.4 through the assembly 108. Concentrations of methane, hydrogen and carbon dioxide in the exiting pre-processed fuel feedstock gas were measured at the outlet of the assembly 108. As can be seen, an increase in the steam to carbon ratio from 3.0 to 3.4 resulted in an increased hydrogen production by the assembly.

The performance of the assembly 108 was also tested with propane fuel feedstock to which was added different hydrogen concentrations. Fuel feedstock used during this test comprised 5 scfm of propane and 39 scfm of steam (steam to carbon ratio of 2.6) and had an inlet temperature of 310° C.

Figure 11:
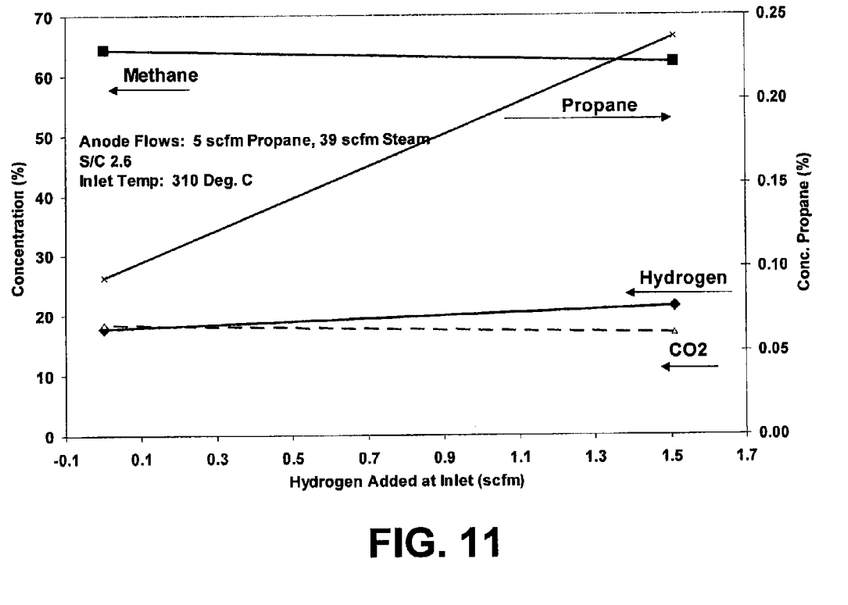
FIG. 11 shows a graph of the effect of adding hydrogen to the fuel feedstock gas input to the assembly of FIG. 4 on the exiting pre-processed fuel feedstock gas component concentrations.

Different amounts of hydrogen were added to the fuel feedstock at the inlet of the assembly 108. FIG. 11 shows a graph of the effect of hydrogen added to the fuel feedstock on the concentrations of methane, propane, hydrogen and carbon dioxide in the exiting pre-processed fuel feedstock gas. As shown, the concentration of propane increased as the amount of hydrogen added at the inlet of the assembly 108 increased. These tests show that the assembly 108 is capable of operating without an additional hydrogen supply, and that the addition of hydrogen resulted in decreased conversion of propane, thus detracting from the performance of the assembly.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention. For example, various modifications of the catalyst bed construction of the invention may be made to optimize the space velocity and the superficial velocity of the fuel feedstock gas as it is being passed through the pre-reforming bed. Moreover, other deoxidizing and pre-reforming catalysts may be used in the beds 202 and 204 in lieu of those discussed above.

What is claimed is:

1. A pre-processing assembly for processing fuel feedstock for a fuel cell, said pre-processing assembly comprising:
   a supply unit for supplying the fuel feedstock to the pre-processing assembly, wherein the fuel feedstock includes oxygen and hydrocarbons having higher and lower hydrocarbon content and the hydrocarbons having higher hydrocarbon content include at least one of propylene and propane;
   a deoxidizing unit for reducing the oxygen in said fuel feedstock;
   a propane processor unit for reducing propylene and propane in said fuel feedstock to lower hydrocarbons, wherein the propane processor unit outputs a partially processed fuel feedstock with a reduced propylene and propane content and an increased lower hydrocarbon content; and
   a pre-reforming unit for reducing the higher hydrocarbon content in said partially processed fuel feedstock,
   wherein the propane processor unit is separate from the pre-reforming unit, and the propane processor unit and the pre-reforming unit are disposed so that the fuel feedstock passes through the propane processor unit and thereafter the partially processed fuel feedstock output from the propane processor unit passes through the pre-reforming bed; and
   wherein the propane processor unit includes a first catalyst selective toward propane and propylene and comprising a nickel-based carbon resistant catalyst, and the pre-reforming unit includes a pre-reforming catalyst different from the first catalyst, and
   wherein the deoxidizing unit is downstream from the supply unit, the propane processor unit is downstream from the deoxidizing unit, and the pre-reforming unit is downstream from the propane processor unit.

2. A pre-processing assembly according to claim 1, wherein said deoxidizing unit, said propane processor unit and said pre-reforming unit are disposed within a common vessel.

3. A pre-processing assembly according to claim 2, wherein said deoxidizing unit comprises a deoxidizing bed, said pre-reforming unit comprises a pre-reforming bed and said propane processor unit comprises a propane processor bed.

4. A pre-processing assembly according to claim 3, wherein said deoxidizing bed, said propane processor bed and said pre-reforming bed are disposed within said common vessel such that said fuel feedstock passes through said deoxidizing bed first, then through one of said propane processor bed and said pre-reforming bed, and thereafter through the other of said propane processor bed and said pre-reforming bed.

5. A pre-processing assembly according to claim 4, wherein said deoxidizing bed, said propane processor bed and said pre-reforming bed are disposed within said common vessel such that said fuel feedstock passes through said deoxidizing bed first, then through said propane processor bed, and thereafter through said pre-reforming bed.

6. A pre-processing assembly according to claim 4, wherein said deoxidizing bed comprises a deoxidizing catalyst and said pre-reforming bed comprises a pre-reforming catalyst.

7. A pre-processing assembly according to claim 6, wherein said deoxidizing catalyst is one of Pt—Pd on alumina catalyst, Pt—Rh-based catalyst and Rh—Pd-based alumina catalyst.

8. A pre-processing assembly according to claim 7, wherein said deoxidizing catalyst is G-74D.

9. A pre-processing assembly according to claim 7, wherein said pre-reforming catalyst is a nickel based catalyst.

10. A pre-processing assembly according to claim 9, wherein said pre-reforming catalyst is one of C11-PR, CRG-F, CRG-LH and G-180.

11. A pre-processing assembly according to claim 10, wherein said first catalyst is FCR-HC59.

12. A pre-processing assembly according to claim 11, wherein:
   said deoxidizing bed has a volume of 0.7 cubic feet;
   said propane processor bed has a volume of 0.75 cubic feet;
   said pre-reforming bed has a volume of 1.7 cubic feet.

13. A pre-processing assembly according to claim 12, wherein:
   the space velocity of said fuel feedstock in said deoxidizing bed is between 5,000 and 10,000 $h^{-1}$;
   the space velocity of said fuel feedstock in said propane processor bed is between 1900 and 10,000 $h^{-1}$; and
   the space velocity of said fuel feedstock in said pre-reforming processor bed is between 2,000 and 5,000 $h^{-1}$.

14. A pre-processing assembly according to claim 13, wherein the fuel inlet temperature is between 300 and 450° C.

15. A pre-processing assembly according to claim 14, wherein said deoxidizer bed is adapted to operate at a temperature between 300° C. and 600° C., said propane processor bed is adapted to operate at a temperature between 300° C. and 540° C., and said pre-reforming bed is adapted to operate at temperature between 300° C. and 540° C.

16. A pre-processing assembly according to claim 15, wherein the steam to carbon ratio in said fuel feedstock is between 2.9 and 3.4.

17. A pre-processing assembly according to claim 1, wherein said pre-reforming unit is further adapted to remove sulfur-containing compounds from said fuel feedstock.

18. A pre-processing assembly according to claim 1, wherein said assembly is adapted to process natural gas, HD-5 and LPG hydrocarbon fuel feedstocks to produce methane rich gas for use in a high temperature fuel cell.

19. A pre-processing assembly according to claim 1, wherein the maximum superficial velocity of the fuel feedstock in the pre-reforming unit is no greater than 1.3 ft/s at STP conditions in order to ensure increased hydrogen back diffusion in the pre-reforming unit so as to maintain the reducing atmosphere in the pre-reforming unit.

20. The pre-processing assembly according to claim 1, wherein the first catalyst in the propane processor unit comprises the nickel-based carbon resistant catalyst for converting propane and propylene in the fuel feedstock to methane and carbon oxides so as to prevent carbon formation and carbon deposition in the pre-reforming unit.

21. The pre-processing assembly according to claim 1, wherein the first catalyst comprises the nickel-based carbon-resistant catalyst doped with one or more promoters, the one or more promoters comprising one or more of cerium oxide, lanthanum oxide, palladium and platinum.

22. A pre-processing assembly for processing fuel feedstock for a fuel cell, said pre-processing assembly comprising:
- a supply unit for supplying the fuel feedstock to the pre-processing assembly, wherein the fuel feedstock includes oxygen and hydrocarbons having higher and lower hydrocarbon content and the hydrocarbons having higher hydrocarbon content include at least one of propylene and propane;
- a deoxidizing unit for reducing the oxygen in said fuel feedstock;
- a propane processor unit for reducing propylene and propane in said fuel feedstock to lower hydrocarbons, wherein the propane processor unit outputs a partially processed fuel feedstock with a reduced propylene and propane content and an increased lower hydrocarbon content; and
- a pre-reforming unit for reducing the higher hydrocarbon content in said partially processed fuel feedstock, wherein the propane processor unit includes a first catalyst selective toward propane and propylene and comprising a carbon resistant nickel-based catalyst doped with one or more promoters, the one or more promoters including one or more of cerium oxide, lanthanum oxide, palladium and platinum, and wherein the deoxidizing unit is downstream from the supply unit, the propane processor unit is downstream from the deoxidizing unit, and the pre-reforming unit is downstream from the propane processor unit.

* * * * *